J. H. GOSS.
ELECTRIC LIGHT SOCKET CAP.
APPLICATION FILED JAN. 3, 1911.

1,006,651.

Patented Oct. 24, 1911.

WITNESSES
C. N. Walker.
Lillie M. Perry.

INVENTOR
John H. Goss
by W. H. Finckel
Attorney

UNITED STATES PATENT OFFICE.

JOHN H. GOSS, OF WATERBURY, CONNECTICUT, ASSIGNOR TO SCOVILL MANUFACTURING COMPANY, OF WATERBURY, CONNECTICUT, A CORPORATION OF CONNECTICUT.

ELECTRIC-LIGHT-SOCKET CAP.

1,006,651. Specification of Letters Patent. Patented Oct. 24, 1911.

Application filed January 3, 1911. Serial No. 600,538.

*To all whom it may concern:*

Be it known that I, JOHN H. GOSS, a citizen of the United States, residing at Waterbury, in the county of New Haven and State of Connecticut, have invented a certain new and useful Improvement in Electric-Light-Socket Caps, of which the following is a full, clear, and exact description.

This invention relates to the caps of electric light sockets, such as are commonly used for the reception and support of incandescent bulbs.

The object of the invention is to provide for the attachment to the cap of the hub used to secure the socket to a fixture, in such way as to prevent the loosening of the joint of the cap and hub by the twisting strains incident to screwing the socket on to the fixture, and to permit the use of comparatively thick sheet metal in the manufacture of the cap.

The invention consists of a cap having a hub-hole surrounded by an outwardly extending straight, upright, circular flange, and a hub having a flange to enter the hub-hole, and a surrounding groove to receive the hub-hole flange, (said last mentioned flange hereinafter being referred to as the "cap-flange"), the hub flange being expanded, headed-up, or staked flat over the inside of the cap adjacent to its hub-hole, in a horizontal or parallel plane and thereby drawing the cap-flange into the hub-groove and effecting a firm union of the cap and hub capable of resisting the twisting strains to which the socket is exposed in screwing it, by means of its hub, to the supporting fixture. This strain-resisting effect may be augmented by nurling or milling or otherwise roughening the outer surface of the hub flange where it comes into contact with the cap and its flange.

Figure 1:
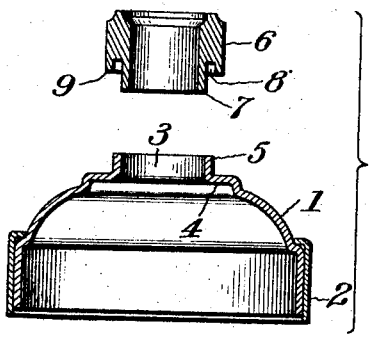
Figure 5:
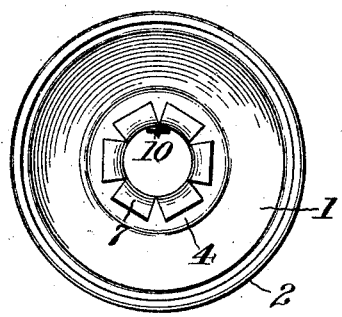
Figure 2:
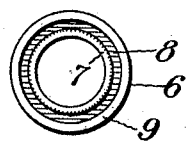
Figure 3:
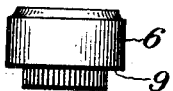
Figure 6:
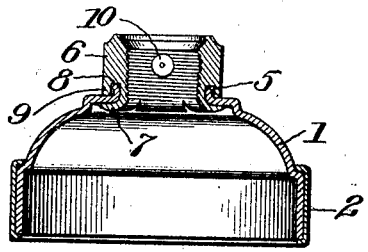
Figure 4:
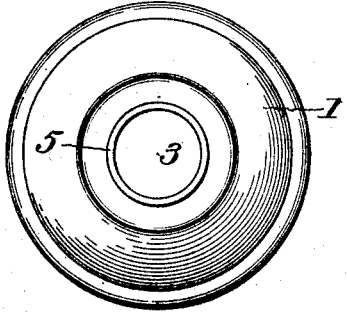
Figure 7:
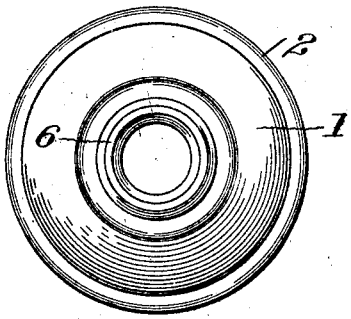

In the accompanying drawings, illustrating the invention, in the several figures of which like parts are similarly designated, Figure 1 shows in cross-section the two parts of the cap construction. Fig. 2 is a bottom plan view, and Fig. 3 is a side view of the hub detached. Fig. 4 is a top plan view of the cap detached. Fig. 5 is a bottom or inside plan view; Fig. 6 is a cross-section, and Fig. 7 is a top plan view of the finished cap.

The cap or shell 1 is of any approved design or configuration, with or without the encircling band 2 at its base, and having the hub-hole 3. The hub-hole is surrounded by the recess 4. A straight flange 5 is formed around the hub-hole and extends outwardly therefrom, in other words, stands outside of the cap. This flange is circular by preference.

The hub 6 has the flange 7 and the surrounding groove 8 cut in the shoulder 9 adjacent to the hub flange, and of a size to receive the cap flange 5. The external surface of the hub flange may be knurled, milled, or otherwise roughened, as shown in Figs. 2 and 3, in order to increase its grasp or grip upon the adjacent metal of the cap when the two are united.

10 is a set-screw for fixing the socket to the supporting fixture when screwed down thereon.

The hub has its flange inserted in the hub-hole, with the cap flange extending into the groove 8, and then by means of suitable staking tools the hub and cap flange are forced into intimate union, the hub flange being turned out horizontally or substantially at right angles to the longitudinal axis of the hub, and clenched flat or parallel against the inside of the cap within its recess 4, as seen in Figs. 5 and 6. In this operation of uniting the hub and cap, the hub-flange may be more or less split, or it may remain whole; and the cap flange may be more or less bent, as indicated in Fig. 6, but it is designed to have such a relatively tight fit between parts that the staking of the hub flange against the inside of the cap will draw the two into a union which is capable of resisting effectively the ordinary twisting strains to which the device is exposed in screwing the socket to its fixture, and without material deformation or folding of the cap flange. It will be observed that the flattening out of the hub flange in the recess 4, as described, extends this flange, when set, beneath the shoulder 9, so that the metal of the cap is gripped between said flattened out flange and said shoulder, thus permitting the described drawing of the hub and cap into an effective strain-resisting union, and permitting the use of thick or heavy metal in the cap. The grip of the hub on the cap will be enhanced by the nurling on the hub flange, said nurling crossing the line of direction of the twisting strain at right angles.

By the construction described, a shorter hub-flange 7 may be used, no reinforcing washer to take the clenched end of the hub flange is necessary, and the cap may be made of very much heavier metal than has been previously used, with the result of economy in assembling and increase in strength as compared with former constructions, and a decided cheapening of the construction in addition.

In a prior invention, Patent No. 877,326, dated January 21, 1908, I used a grooved hub and an outwardly extending cap flange, but this flange has a vertical member and a horizontal member, requiring a hub-groove of considerable width and a closing pressure sufficient to embed the cap flange in the hub, and it was necessary to employ a comparatively thin metal in the cap in order to effectively unite the hub and cap. Not only is the horizontal flange of the patent in question omitted here, with a resulting economy in manufacture, but the straight flange of the present invention admits of the use of heavier metal in the cap.

The band 2 may or may not be used, and the base of the cap next to it may be whole or otherwise formed as desired.

The invention is not limited to the single form of cap or shell here shown.

What I claim is:—

1. An electric light socket cap or shell, made of thick metal and having a hub-hole and a surrounding outwardly extending, straight, upright circular flange, and a hub having a flange inserted in said hub-hole and provided with a shoulder having a groove which surrounds the hub-flange and receives the cap-flange, the hub-flange being staked out flat within the cap, the metal of the cap around the hub-hole being gripped between the staked-out hub-flange and the shoulder on the hub, thereby drawing the hub and cap into intimate non-rotating union.

2. An electric light socket cap or shell, made of thick metal and having a hub-hole with an adjacent recess, and a surrounding outwardly extending, straight, upright circular flange, and a hub having a knurled flange inserted in said hub-hole and provided with a shoulder having a groove which surrounds the hub-flange and receives the cap-flange, the hub-flange being staked out flat within the recess in the cap, the metal of the cap's recess being gripped between the staked-out hub-flange and the shoulder on the hub, thereby drawing the hub and cap into intimate non-rotating union.

In testimony whereof I have hereunto set my hand this 31st day of December, A. D. 1910.

JOHN H. GOSS.

Witnesses:
CHAS. W. KELLOGG,
G. F. HODGES.